US011903352B1

(12) United States Patent
Ismaeil et al.

(10) Patent No.: US 11,903,352 B1
(45) Date of Patent: Feb. 20, 2024

(54) SUSTAINABLE SOFT AND SOLID NATIVE LANDSCAPE FOR ARID AND SEMI-ARID REGIONS

(71) Applicant: KING FAISAL UNIVERSITY, Al-Ahsa (SA)

(72) Inventors: Esam Mohamed Housein Ismaeil, Al-Ahsa (SA); Abu Elnasr Elsayed Abu Elnasr Sobaih, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/131,503

(22) Filed: Apr. 6, 2023

(51) Int. Cl.
*A01G 9/02* (2018.01)
*A01G 7/00* (2006.01)

(52) U.S. Cl.
CPC ...................... *A01G 7/00* (2013.01)

(58) Field of Classification Search
CPC ........... A01G 7/00; A01G 9/027; A01G 9/028
See application file for complete search history.

(56) References Cited

U.S. PATENT DOCUMENTS

| 10,274,969 | B2* | 4/2019 | Klein | A01G 25/165 |
| 2004/0049978 | A1* | 3/2004 | Lips, II | A01C 23/042 |
| | | | | 47/48.5 |
| 2005/0164799 | A1* | 7/2005 | Ricigliano | A63B 67/02 |
| | | | | 473/169 |
| 2010/0043285 | A1* | 2/2010 | Kelty | A01G 9/027 |
| | | | | 47/81 |
| 2011/0186658 | A1* | 8/2011 | Wuchert | B23P 19/00 |
| | | | | 239/723 |
| 2012/0126026 | A1* | 5/2012 | Sparks | G01N 27/223 |
| | | | | 324/689 |

(Continued)

OTHER PUBLICATIONS

Southwest Florida Water Management District; "Seven Steps for a Successful Xeriscape"; Revised Jul. 2001; https://stormwater.ucf.edu/toolkit/vol1/Contents/pdfs/Lawn%20and%20Garden/Xeriscape-SevenSteps.pdf (Year: 2001).*

(Continued)

*Primary Examiner* — Edwin J Toledo-Duran
(74) *Attorney, Agent, or Firm* — Nath, Goldberg & Meyer; Richard C. Litman

(57) ABSTRACT

Applying sustainable approaches in the landscape of public and private projects in a desert region (arid or semi-arid regions such as Saudi Arabia) is crucial to preserve natural resources such as water. It is possible to design a desert public university campus to save 82% of water consumption while having a modern landscape. This modern landscape is more acceptable to the campus population than a traditional desert landscape. This is a sustainable native soft and solid landscape for usage in public and private spaces in arid and semi-arid regions. It supports the national and international direction towards transforming into green societies while saving natural resources, i.e., water. Decision-makers, landscape engineers, agriculture engineers, architects' engineers, and any interested person or specialist organization can design their own ideas landscapes following the soft and solid materials quantities and ratios herein with approximately 2.26 L/m² water consumption rate.

20 Claims, 3 Drawing Sheets

(56) References Cited

U.S. PATENT DOCUMENTS

| | | | | |
|---|---|---|---|---|
| 2012/0231425 A1* | 9/2012 | Calman | ............... | G06V 20/20 |
| | | | | 434/93 |
| 2013/0080213 A1* | 3/2013 | Peters | ............... | G06Q 10/10 |
| | | | | 705/7.38 |
| 2014/0213144 A1* | 7/2014 | Amy | ............... | A01K 51/00 |
| | | | | 449/2 |
| 2014/0215731 A1* | 8/2014 | Hill | ............... | B07B 1/005 |
| | | | | 15/3 |
| 2014/0351014 A1* | 11/2014 | Lopez | ............... | G06Q 50/06 |
| | | | | 705/7.31 |
| 2015/0181383 A1* | 6/2015 | Schulz | ............... | H04W 4/021 |
| | | | | 455/456.3 |
| 2015/0319941 A1* | 11/2015 | Klein | ............... | G05B 19/0426 |
| | | | | 700/284 |
| 2015/0368893 A1* | 12/2015 | Ros Garcia | ............... | E04H 1/02 |
| | | | | 52/80.1 |
| 2016/0158783 A1* | 6/2016 | Wiebe | ............... | A01G 25/16 |
| | | | | 239/69 |
| 2020/0071897 A1* | 3/2020 | Parker | ............... | E02F 9/2054 |
| 2020/0164397 A1* | 5/2020 | Shoemake | ............... | B05B 15/72 |
| 2021/0307269 A1* | 10/2021 | Massey | ............... | A01G 31/06 |
| 2023/0082957 A1* | 3/2023 | Hughes | ............... | A01N 43/40 |
| | | | | 504/136 |
| 2023/0203771 A1* | 6/2023 | Benson | ............... | E02B 3/023 |
| | | | | 210/170.04 |

OTHER PUBLICATIONS

Ismaeil et al., "Assessing Xeriscaping as a Retrofit Sustainable Water Consumption Approach for a Desert University Campus," Water 2022, 14(11), 1681.
Sovocool, "Xeriscape Conversion Study Final Report 2005", Southern Nevada Water Authority 2005.
Yang et al., "Planning for a sustainable desert city: The potential water buffering capacity of urban green infrastructure," Landscape and Urban Planning, vol. 167, Nov. 2017, pp. 339-347.
St. Hilaire et al., "Efficient Water Use in Residential Urban Landscapes," HortScience, vol. 43, No. 7, pp. 2081-2092 (2008).
Saygin et al., "Stormwater Management and Green Infrastructure Techniques for Sustainable Campus Design," Journal of Polytechnic, vol. 14, No. 3 pp. 223-231 (2011).
Ayala, "Campus saves water with native plants, landscaping design," The Daily Texan, Apr. 5, 2013.

* cited by examiner

SUSTAINABLE SOFT AND SOLID NATIVE LANDSCAPE FOR ARID AND SEMI-ARID REGIONS

BACKGROUND

1. Field

The disclosure of the present patent application relates to a novel, sustainable approach for landscaping, and particularly to an approach for landscaping in arid or semi-arid regions that maximizes water conservation.

2. Description of the Related Art

Population growth, economic development, and dietary shift (toward more animal products) have resulted in ever-increasing water demand and, consequently, pressures on water resources. Water is one of the most essential natural resources and is the backbone of life. It is included in many human activities such as agriculture, medicine, construction, spinning and weaving, and various industries. Water covers about 70% of the planet; however, only 3% of the world's water is freshwater. Additionally, two-thirds of that water is tucked away in frozen glaciers or unavailable for our use. Many water systems that keep ecosystems thriving and feed a growing human population have become stressed. Rivers, lakes, and aquifers are drying up or becoming more polluted for human use. More than half the world's wetlands have disappeared. Agriculture consumes more water than other sources and wastes much of that through inefficiencies. Climate change is altering weather and water patterns worldwide, causing shortages and droughts in some areas and floods in others. At the current consumption rate, this situation will likely get worse. By 2025, two-thirds of the world's population may face water shortages.

Furthermore, ecosystems around the world suffer even more. Agriculture uses 70% of the world's accessible freshwater, but 60% of this is wasted due to leaky irrigation systems. Even groundwater is not safe from pollution, as many pollutants can leach into underground aquifers. Reducing the number of people suffering from water scarcity is also one of the main goals set in the Sustainable Development Goals (SDGs) as highlighted by the United Nations. A key to creating a sustainable landscape is to include native plants to the area or plants that are well adapted to similar growing conditions. The main aim of sustainability is to reduce the consumption of resources and reach the limit of the production of resources to a better extent. For water, this could apply through processes such as water reuse and water harvesting. There is a persistent need for sustainable landscapes in public campuses using recent software like virtual reality to ensure that workplaces are productive and healthy. Furthermore, the hedonic price method (HPM) and the contingent valuation method (CVM) are two valuation techniques used to estimate and report the benefits of public and private environmental goods.

There are several approaches or examples of applying water sustainability to the university campus.
1. Maximizing on-site storm-water management by focusing on filtering runoff resulting from rainfall events equal to or less than 1 (for example, about 80% of all rainfall events in Eugene, OR).
2. Limiting off-site drainage whenever possible.
3. Using plant materials and terrain to slow and absorb runoff, filter sediments, and facilitate infiltration.
4. Maximizing pervious surfaces to permit water infiltration where possible.
5. Minimizing the need for landscape irrigation.
6. Using weather-based irrigation controls to minimize runoff and excess water use.
7. Using natural drainage ways wherever possible.
8. Using grey-water and water-saving devices.
9. Using plantings that can tolerate low summer watering.

According to the American Society of Landscape Architects (ASLA), the principles of a sustainable landscape design include: rainwater/greywater harvesting—88%, native plants—86%, native/adapted drought-tolerant plants—85%, low maintenance landscapes—85%, permeable paving—77%, firepits/fireplaces—75%, food/vegetable gardens (including orchard, vineyards)—75%, rain gardens—73%, drip irrigation-—72%, and reduced lawn area—72%. The main goals of sustainable landscape design are to conserve water and energy, reduce waste and decrease runoff. Residential gardens should treat water as a resource, value soil, preserve existing plants, and conserve material resources to achieve these goals.

Xeriscape is a contemporary landscape maintenance term coined from the Greek word xeros, meaning dry, and from the Anglo-Saxon term sc-hap meaning view. The practice of xeriscape encompasses many landscape styles and materials, from lush gardens to desert-like landscapes. Xeriscape can be defined as specific landscaping that works with the principle of protecting the water resources and the environment. It is the process of landscaping, or gardening, that reduces or eliminates the need for irrigation and maintenance. It can also be defined as a water-efficient landscaping and natural landscaping that aims to protect the water resources and environment by using the least amount of water in general. It is also known as arid landscaping worldwide, a landscaping scheme that adopts the principle of protecting the water resources and the environment with a minimum of water use.

With current climate conditions, fresh drinking water is becoming a scarce commodity globally as droughts rise. The landscape is easy to maintain, capable of withstanding drought, and conserving and retaining water; xeriscaping is different from natural landscaping or local landscaping in that, i.e., the focus is on water conservation. Planting non-native plants that are drought-resistant or can survive without additional water is more important than plants that are part of the ecosystem already.

Xeriscaping or xerigardening is promoted in regions that do not have accessible, plentiful, or reliable freshwater supplies and is gaining acceptance in other regions as access to irrigation water is becoming limited. Xeriscaping may be an alternative to various types of traditional gardening; in some areas, terms such as water-conserving landscapes, drought-tolerant landscaping, or intelligent scaping are used instead. The xeriscaping method produces and utilizes vegetation as greenspaces with native/indigenous/natural plants, gravel, wood chips, and natural solid material, appropriate to the local climate. Therefore, with current climate conditions, fresh drinking water is becoming a scarce commodity on a global scale as the frequency of droughts rapidly rises. Zero-scaping is sometimes substituted for xeriscaping due to phonetic similarity.

Xeriscapes can reduce water consumption by 60% or more compared to regular lawn landscapes. In Turkey, one of the first large-scale xeriscaping evaluations was conducted and found that switching an average city park to more native vegetation in the region lowered irrigation usage by 30-50%. A city, with a water usage reduction of 30%, can save roughly $2 million annually; however, the exact value depends on location. Applied research has recognized xeriscaping as an effective water reduction approach. It reduces outdoor water use and irrigation to encourage and incentivize xeriscaping for greenspace development. Xeriscaping can require far less time and effort to maintain, save money because there is little or no need for cutting lawns, reduce landscape water usage and waste by 50 to 75%, reduce pollution by 75%, and save 10-30% on utility bills.

Xeriscaping is theorized to help offset the urban heating island (UHI); it was found that dry areas that utilized xeriscaping with shade trees mitigate UHI effects during the day and night with an average temperature difference of roughly 2.5° C. (4.5° F.) cooler. The use of xeriscaping water within ecological sustainability is essential for the design stage. Xeriscaping creates healthy and environmentally sound landscapes that use less fertilizer and pesticides, which has become a vital implementation issue in today's conditions and compatible nature landscapes in arid areas with limited water resources. The xeriscape approach includes environment protection and water-efficient landscape implementation.

The xeriscaping practice also contributes to vegetation loss, an increasingly heterogeneous landscape, and water efficiency through mulching, appropriate plant selection, and landscape design. The xeriscape feature goal is to submit opportunities for urban regions to enhance future water conservation and landscape conversions from monoculture grass lawns to the xeriscape concept. Landscape architecture applications improve environmental quality and repair the corrupted environmental conditions; wise usage of water and aridity-resistant vegetal applications came forward with global warming and some concerns connected to the climate change. Several cities' "xeriscaping" policy involve landscape conversion of water-intensive plants to low-water-demand, drought-resistant vegetation.

Water-efficient landscaping is the fundamental approach for water conservation in arid and semi-arid regions. Therefore, intensive landscaping of mixed plant materials consumes a massive amount of water, whereas xeriscaping minimizes water-use landscaping because of its environmental and financial benefits. The environmental aspect of xeriscaping is choosing vegetation appropriate for the climate, called drought-tolerant vegetation. Xeriscaping often replaces grassy lawns with soil, rocks, mulch, and drought-tolerant native plant species. Trees flowers, specially adapted to arid climates, are called xerophytes and can reduce water use by up to 75%.

Green spaces (GSs) are significant, nature-based solutions to climate change and have immense potential to reduce vulnerability to heat waves while enhancing the resilience of urban areas in light of climate change. However, in the Saudi context, the availability of GSs across cities and their perceived role in climate change mitigations and adaptation strategies remain unexplored and challenging due to limited water resources. Planning and design are essential in landscape architecture arrangements and must be determined clearly.

Thus, a sustainable approach for landscaping, and particularly an approach for landscaping in arid or semi-arid regions that maximizes water conservation, solving the aforementioned problems is desired.

SUMMARY

The present subject matter relates to a xeriscaping approach for landscaping in arid or semi-arid regions promoting the effective use of water by including plants with low water requirements. In addition, natural plant species suitable for arid or semi-arid climates are used in the design because they require less watering after the completion of regulation work or do not require additional irrigation, except for natural rainfall. The main aim of the present approach is to protect water resources by minimizing water use.

Accordingly, in one embodiment, the present subject matter relates to an urban landscaping method that achieves a crucial requirement goal in water conservation. The present subject matter demonstrates the value of xeriscaping as a practical approach to water conservation in urban desert regions and similar urban regions.

In one embodiment, the present subject matter relates to a sustainable landscape promoting water conservation, comprising: an about 30×30 m$^2$ surface area of desert retrofitted with amounts of soft and solid materials sufficient to reduce water consumption of plants in the area by up to 82% per day while maintaining the appearance of a landscaped area, the soft materials in the area of desert comprising plants comprising, in percentage of area covered: about 2% palm, about 5% trees, about 5% shrubs and succulents, about 32% groundcover and climbers, and about 3% grass; and the solid materials in the area of desert comprising, in percentage of area covered: about 16% mulch and natural gravel; about 16% natural stone; and about 21% interlock.

In another embodiment, the present subject matter relates to a method of obtaining a sustainable landscape that reduces water consumption of plants in an about 30×30 m$^2$ area by up to 82% per day while maintaining the appearance of a landscaped area promoting water conservation, comprising: selecting an about 30×30 m$^2$ surface area of desert; and retrofitting the selected surface area of desert with amounts of soft and solid materials sufficient to reduce water consumption of plants in the surface area of desert by up to 82% per day while maintaining the appearance of a landscaped area promoting water conservation, wherein the soft materials in the surface area of desert comprise plants comprising, in percentage of area covered: about 2% palm, about 5% trees, about 5% shrubs and succulents, about 32% groundcover and climbers, and about 3% grass; and wherein the solid materials in the surface area of desert comprise, in percentage of area covered: about 16% mulch and natural gravel, about 16% natural stone, and about 21% interlock.

In a further embodiment, the present subject matter relates to a sustainable landscape promoting water conservation, comprising: an about 30×30 m$^2$ surface area of desert retrofitted with amounts of soft and solid materials sufficient to reduce water consumption of plants in the area by up to 82% per day while maintaining the appearance of a landscaped area, the soft materials in the area of desert comprising plants consisting of, in percentage of area covered: about 2% palm made up of 2 Phoenix dactylifera, about 5% trees made up of 3 Albizia lebbeck, 3 Azadirachta indica, 3 Ziziphus spina, 3 Hibiscus tiliaceus, and 3 Pithecellobium dulce, about 5% shrubs and succulents made up of 5 Cassia Glauca, 6 Bougainvillea, 5 V itex agnus, 6 Plumeria obtusa, 15 Aloe perfoliate var. vera, 15 Agava—Americana, and 15 yucca, about 32% groundcover and climbers made up of about 22 m$^2$ of Alternanthera, about 20 m$^2$ of Gazania Grandifloura, and about 20 m$^2$ of Wedelia florida, and about 3% grass made up of about 20 m$^2$ of grass CL-2000; and the solid materials in the area of desert comprising, in percentage of area covered: about 16% mulch and natural gravel made up of about 150 m$^2$ of mulch and about 150 m$^2$ of natural gravel, about 16% natural stone made up of about 75 m² of natural stone, and about 21% interlock made up of about 190 m² of interlock.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
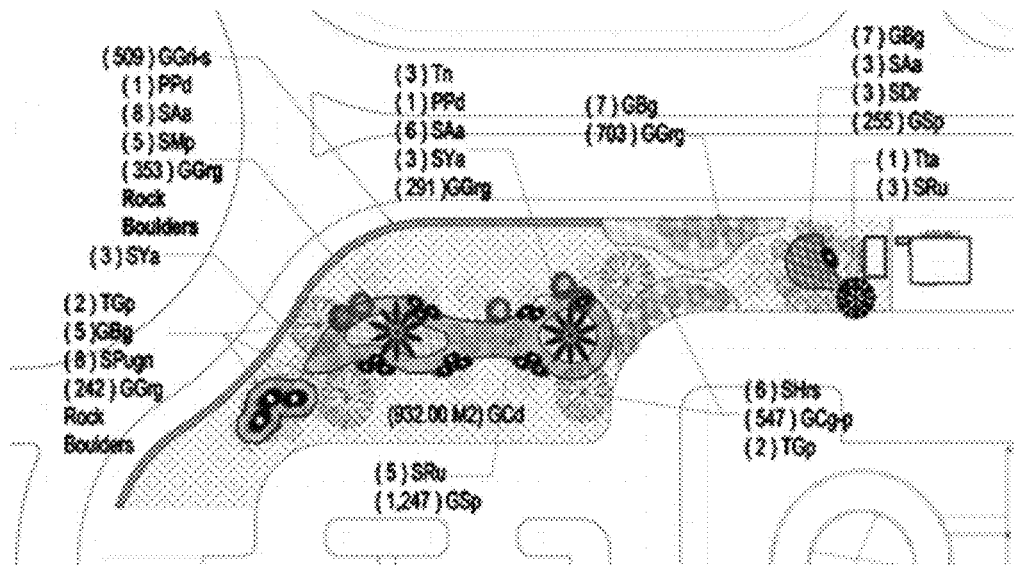
FIG. 1 shows the consumption water quantity for each softscape item, the tender design for this area, and a photo before applying the present study to PARKING 14.

The following definitions are provided for the purpose of understanding the present subject matter and for construing the appended patent claims.

Definitions

It should be understood that the drawings described above or below are for illustration purposes only. The drawings are not necessarily to scale, with emphasis generally being placed upon illustrating the principles of the present teachings. The drawings are not intended to limit the scope of the present teachings in any way.

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The present subject matter relates to a xeriscaping approach for landscaping in arid or semi-arid regions promoting the effective use of water by including plants with low water requirements. In addition, natural plant species suitable for arid or semi-arid climates are used in the design because they require less watering after the completion of regulation work or do not require additional irrigation, except for natural rainfall. The main aim of the present approach is to protect water resources by minimizing water use.

The main aim of the xeriscape landscape design approach is to protect water resources by minimizing water use. The water-efficient landscape design (xeriscape) includes water-demanding crop plants and water-saving alternative irrigation methods, mulching, etc. Xeriscape (low-water-use landscaping) has held the promise of significant water savings for several years. The purpose of xeriscaping is to achieve low garden maintenance measured by less watering, less fertilizer and pesticides, less weeding, and less mowing. The benefits of xeriscaping include reducing water waste; using minimum efficient irrigation and fertilizer usage; reducing maintenance time; water requirements being low; reducing pollution; making a healthy environment by removing acres of sod; gas-powered mowers will not require the moisture; reducing heat islands to improve sustainable requirements; and improving the community's overall look.

Accordingly, in one embodiment, the present subject matter relates to an urban landscaping method that achieves a crucial requirement goal in water conservation. The present subject matter demonstrates the value of xeriscaping as a practical approach to water conservation in urban desert regions and similar urban regions.

In one embodiment, the present subject matter relates to a sustainable landscape promoting water conservation, comprising: an about 30×30 $m^2$ surface area of desert retrofitted with amounts of soft and solid materials sufficient to reduce water consumption of plants in the area by up to 82% per day while maintaining the appearance of a landscaped area, the soft materials in the area of desert comprising plants comprising, in percentage of area covered: about 2% palm, about 5% trees, about 5% shrubs and succulents, about 32% groundcover and climbers, and about 3% grass; and the solid materials in the area of desert comprising, in percentage of area covered: about 16% mulch and natural gravel; about 16% natural stone; and about 21% interlock.

In an embodiment, the palm used in the present xeriscaping/landscaping is Phoenix dactylifera. In another embodiment, the trees used in the present xeriscaping/landscaping comprise Albizia lebbeck, Azadirachta indica, Ziziphus spina, Hibiscus tiliaceus, and Pithecellobium dulce. In a further embodiment, the shrubs and succulents used in the present xeriscaping/landscaping comprise Cassia Glauca, Bougainvillea, V itex agnus, Plumeria obtusa, Aloe perfoliate var. vera, Agava—Americana, and yucca. Similarly, in one more embodiments, the groundcover and climbers used in the present xeriscaping/landscaping comprise Alternanthera, Gazania Grandifloura, and Wedelia florida, while the grass is grass CL-2000.

In this regard, in an embodiment, the sustainable landscape promoting water conservation can consist of 2 Phoenix dactylifera plants, 3 Albizia lebbeck plants, 3 Azadirachta indica plants, 3 Ziziphus spina plants, 3 Hibiscus tiliaceus plants, 3 Pithecellobium dulce plants, Cassia Glauca plants, 6 Bougainvillea plants, 5 V itex agnus plants, 6 Plumeria obtusa plants, Aloe perfoliate var. vera plants, 15 Agava—Americana plants, 15 yucca plants, 22 $m^2$ of surface area covered by Alternanthera, 20 $m^2$ of surface area covered by Gazania Grandifloura, 20 $m^2$ of surface area covered by Wedelia florida, 20 $m^2$ of surface area covered by grass CL-2000, 150 $m^2$ of surface area covered by mulch, 150 $m^2$ of surface area covered by natural gravel, 75 $m^2$ of surface area covered by natural stone, and 190 $m^2$ of surface area covered by interlock.

Using the present xeriscaping strategy can result in a sustainable landscape promoting water conservation that consumes only 2030 liters of water per day. Taken another way, the present xeriscaping strategy can result in a sustainable landscape that consumes only 2.26 liters of water per $m^2$, as compared to the existing average water consumption of 15.1 liters of water per $m^2$ (L/$m^2$ of water).

The present teachings are illustrated by the following example.

EXAMPLE

An experimental approach was conducted at King Faisal University (KFU), Al-Ahsa, Eastern Province, Saudi Arabia, classified as an arid region, with the following steps:
1—Identify the total green area within the KFU university landscape layout campus which was 118.640 $m^2$ with water consumption of 3911 $m^3$/day.
2—Select four study experiments with a total area of 31,750 $m^2$ representing about 27% of the total KFU landscape layout to apply different designs for the xeriscaping landscape concept instead of the existing conventional landscape.
3—Monitor the four experiments and the results through physical experts and a Supervisory
Control and Data Acquisition (SCADA) system within one year.
4—Account for the total water consumption for the four experimental areas before the study which was 408.8 $m^3$/day, which was compared with the total water consumption for the four experimental areas after applying the xeriscaping study approach which became 241.4 $m^3$/day.
5—Classify the items of xeriscaping landscape design which achieved the lowest water consumption.

These steps are discussed in more detail as follows.

Study Field Experiment 1: Parking 14 Landscape

The Previous Situation for Parking 14 Landscape Area

This study field experiment location is beside the campus male and female student dormitories with an area of 1371 $m^2$. It finishes in tender design containing terrazzo tiles. The hardscape for pavement and softscape items were:
Palms: phoenix dactylifera;
Trees: tabebula ayrea, cassia indosa, and schhinus molle;
Shrubs: hibiscus rosa-sinensis; muraya panuclaya, canna indica, caesalpennia pulcherrima, durantya rebins;
Succulents: agave americana, yucca aloforia prostrata;
Groundcover and climber: carissa grandiflora, gazania-nivea, bougainyilla glabra mixed color, citecressa purpurea; and
Grass: cynodon dactylon; with total 45.814 L (45.8$m^3$) of water consumption. FIG. 1 shows the consumption water quantity for each softscape item, the tender design for this area, and the photo before applying this study.

Applying Xeriscape for Parking 14 Landscape Area

Figure 2:
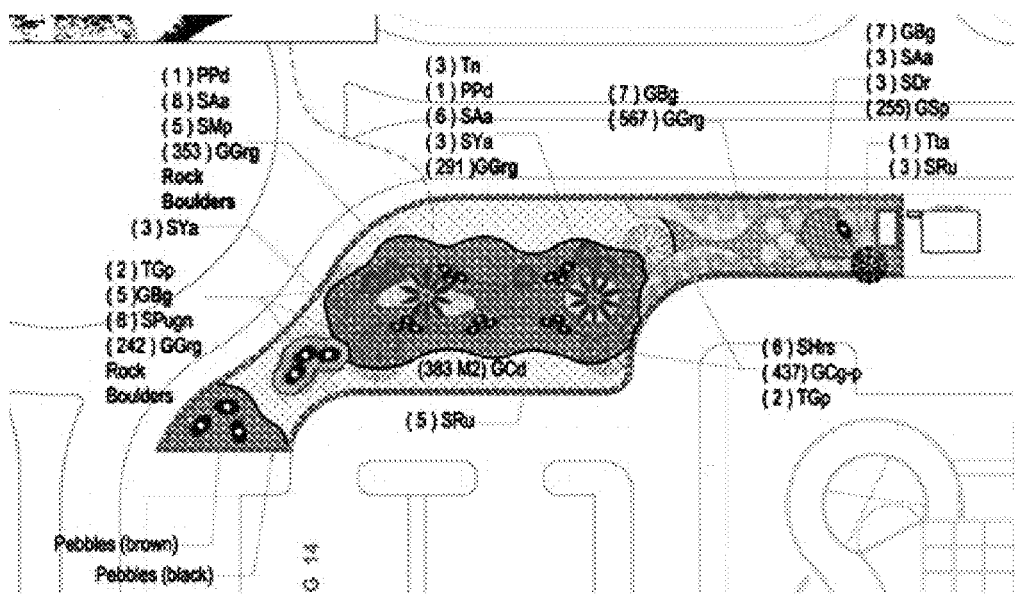
FIG. 2 shows the area after applying xeriscaping to PARKING 14.

The layout design employed contained palms: phoenix dactylifera; trees: tabebula ayrea, cassia indosa, and schhinus molle; shrubs: hibiscus rosa-sinensis; muraya panuclaya, canna indica, caesalpennia pulcherrima, durantya rebins; Succulents: agave americana, yucca aloforia prostrata; groundcover and climber: gazania nivea, bougainyilla glabra mixed color, citecressa purpurea, and carissa grandiflora; grass: cynodon dactylon; hard material: mulch, natural gravel, natural stone, and interlock, with a total/day of 33.478 L (33.5 $m^3$) of water consumption with around a 27% water consumption reduction. FIG. 2 shows the area after applying xeriscaping for the activity walkway landscape.

The Parking 14 landscape with an area of 1371 $m^2$ initially had a design containing 2 hard landscape items and 16 urban native softscape items with a total of 45,814 L (45.8 $m^3$) of water consumption. Applying the xeriscaping landscape design changed the design to one having four hardscapes and 16 urban native softscape with a total/day of 33,478 L (33.5 $m^3$) of water consumption, i.e., a 27% water consumption reduction.

The results of this study can be seen in the following Tables 1 and 2, reflecting before and after xeriscaping:

TABLE 1

Water consumption for each softscape item: previous situation for PARKING 14 landscape area.

| Plant List/Botanical Names, | Unit | Quantity | Daily Water Requirements/ Day | Total Requirements/Day |
|---|---|---|---|---|
| Palms | | | | |
| *phoenix dactylifera* | nos. | 2 | 100 | 200 |
| Trees | | | | |
| *Tabebula ayrea* | nos. | 1 | 80 | 80 |
| *Cassia indosa* | nos | 3 | 80 | 240 |
| *schhinus molle* | nos | 4 | 80 | 320 |
| Shrubs | | | | |
| *Hibiscus rosa sinensis* | nos. | 6 | 12 | 36 |
| *Muraya panuclaya* | nos. | 5 | 12 | 60 |
| *Canna indica* | nos | 8 | 12 | 72 |
| *Caesalpennia pulcherrima* | nos | 8 | 12 | 72 |
| *Durantya rebins* | nos | 3 | 12 | 36 |
| Succulents | | | | |
| *Agave americana* | nos | 17 | 6 | 102 |
| *Yucca aloforia prostrata* | nos | 6 | 6 | 36 |
| Groundcover & climber | | | | |
| *Carissa grandiflora* | nos | 547 | 8 | 4376 |
| *Gazania nivea* | nos | 1566 | 8 | 12,528 |
| *Bougainyilla glabra* mixed colour | nos | 509 | 8 | 4072 |
| *Citecressa purpurea* | nos | 18 | 8 | 144 |
| *Carissa grandiflora* | nos | 1502 | 8 | 12,016 |
| Grass | | | | |
| *Cynodon dactylon* | m² | 952 | 12 | 11424 |
| | | | TOTAL/DAY | 45.814 L |

TABLE 2

Water consumption for each softscape item: Applying xeriscaping for PARKING 14 landscape.

| Plant List/Botanical Names | Unit | Quantity | Daily Water Requirements/ Day | Total Requirements/Day |
|---|---|---|---|---|
| Palms | | | | |
| *phoenix dactylifera* | nos. | 2 | 100 | 200 |
| Trees | | | | |
| *Tabebula ayrea* | nos. | 1 | 80 | 80 |
| *Cassia indosa* | nos | 3 | 80 | 240 |
| *Schhinus molle* | nos | 4 | 80 | 320 |
| Shrubs | | | | |
| *Hibiscus rosa sinensis* | nos. | 8 | 12 | 72 |
| *Muraya panuclaya* | nos. | 5 | 12 | 60 |
| *Canna indica* | nos | 8 | 12 | 96 |
| *Caesalpennia pulcherrima* | nos | 8 | 12 | 96 |
| *Durantya rebins* | nos | 3 | 12 | 36 |
| Succulents | | | | |
| *Agave americana* | nos | 17 | 6 | 102 |
| *Yucca aloforia prostrata* | nos | 6 | 6 | 36 |

TABLE 2-continued

Water consumption for each softscape item:
Applying xeriscaping for PARKING 14 landscape.

| Plant List/Botanical Names | Unit | Quantity | Daily Water Requirements/Day | Total Requirements/Day |
|---|---|---|---|---|
| Groundcover & climber | | | | |
| Gazania nivea | nos | 437 | 8 | 3496 |
| Bougainyilla glabra mixed colour | nos | 1453 | 8 | 11,880 |
| Citecressa purpurea | nos | 19 | 8 | 152 |
| Carissa grandiflora | nos | 1502 | 8 | 12,016 |
| Grass | | | | |
| Cynodon dactylon | m² | 387 | 12 | 4596 |
| Hard material | | | | |
| mulch | m² | 150 | 0 | 0 |
| Natural gravel | m² | 120 | 0 | 0 |
| Natural stone | m² | 145 | 0 | 0 |
| Interlock | | 150 | | |
| | | | TOTAL/DAY | 33.478 L |

Study Field Experiment 2: Parking 4 Landscape

The Previous Situation for Parking 4 Landscape Area

This study field experiment location is in the front of the research center building inside the campus with an area of 1720 m², and finishes in tender design containing terrazzo tiles as hardscape. The softscape items were:

trees: callistemon viminalis, cassia indosa, hibiscus tiliaceaus, plumeria obtuse, and cassia fistula;

shrubs: hibiscus rosa sinensis, tecomaria capensis, vitex agnus castus, saesalpinia pulcherrima, and myrtus communis;

succulents: agave americana;

groundcover and climber: rosmarinus officinalis, gazania nivea, and cortaderia seloania; and grass: cynodon dactylon.

Figure 3:
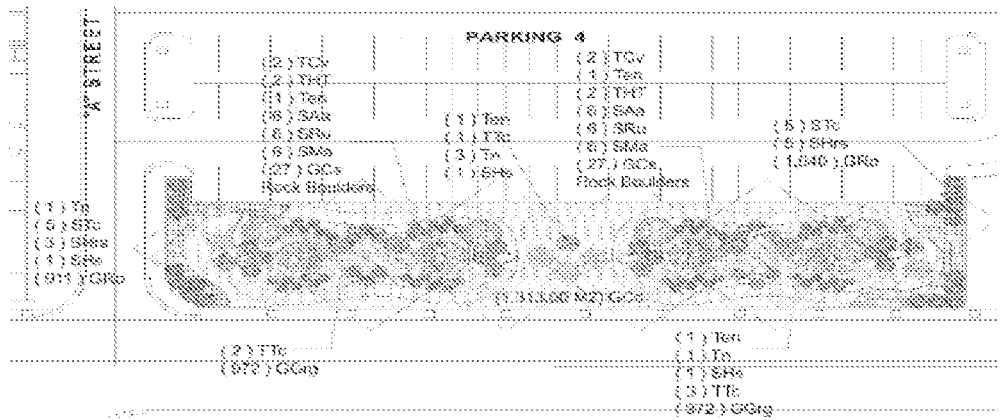
FIG. 3 shows the consumption water quantity for each soft scape item, the tender design for this area, and the photo before applying the present study to PARKING 4.

FIG. 3 shows the consumption water quantity for each soft scape item, the tender design for this area, and the photo before applying this study. The total was 48,600 L (48.6 m³) of water consumption.

Applying Xeriscape for Parking 4 Landscape Area

Figure 4:
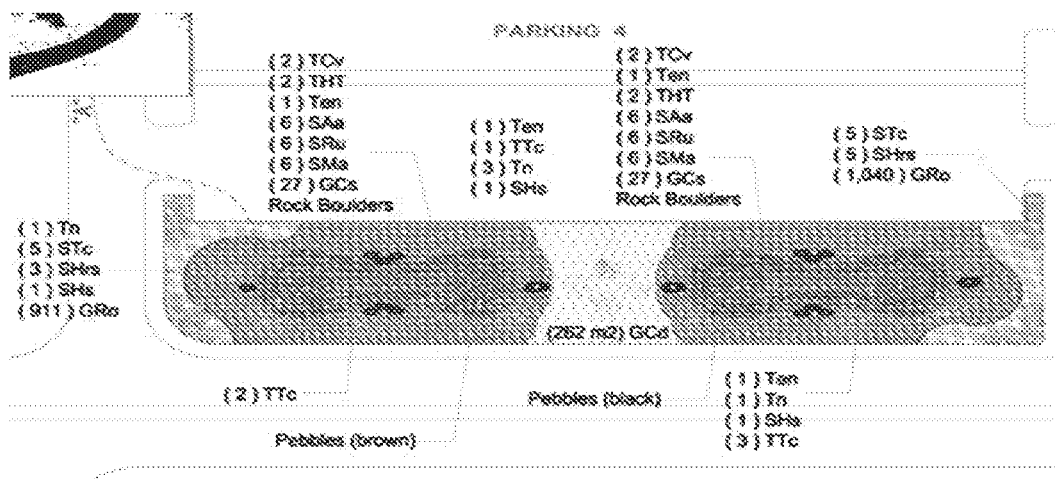
FIG. 4 shows the area after applying xeriscaping to PARKING 4.

FIG. 4 shows the area after applying xeriscaping for the activity walkway landscape. In this study field experiment, the layout design contained trees: callistemon viminalis, cassia indosa, hibiscus tiliaceaus, plumeria obtuse, and cassia fistula; shrubs: hibiscus rosa sinensis, tecomaria capensis, vitex agnus castus, saesalpinia pulcherrima, and myrtus communis; succulents: agave americana; groundcover and climber: rosmarinus officinalis, and cortaderia seloania; grass: cynodon dactylon; hard material: mulch, natural gravel, natural stone, and interlock; with total/day 21,636 L (21.6 m³) of water consumption with around 55.5% water consumption reduction.

The Parking 4 landscape with an area of 1720 m² initially had a design containing 2 hard landscape items and 14 urban native softscape items with a total of 48,600 L (48.6 m³) of water consumption. Applying the xeriscaping landscape design changed the design to one having four hard landscape items and 14 urban native softscape items with a total/day of 21,636 L (21.6 m³) of water consumption, i.e., a 55.5% water consumption reduction.

The Parking 14 landscape with an area of 1371 m² initially had a design containing 2 hard landscape items and 16 urban native softscape items with a total of 45,814 L (45.8 m³) of water consumption. Applying the xeriscaping landscape design changed the design to one having four hardscapes and 16 urban native softscapes with a total/day of 33,478 L (33.5 m³) of water consumption, i.e., a 27% water consumption reduction.

The results of this study can be seen in the following Tables 3 and 4, reflecting before and after xeriscaping:

TABLE 3

Water consumption for each softscape item:
previous situation for PARKING 4 landscape area.

| Plant List Botanical Names | Unit | Quantity | Daily Water Requirements/Day | Total Requirements/Day |
|---|---|---|---|---|
| Trees | | | | |
| Callistemon viminalis | nos. | 4 | 80 | 320 |
| Cassia indosa | nos | 5 | 80 | 400 |
| Hibiscus tiliaceaus | nos | 4 | 80 | 320 |
| Plumeria obtuse | nos | 4 | 80 | 320 |
| Cassia fistula | nos | 6 | 80 | 480 |
| Shrubs | | | | |
| Hibiscus rosa sinensis | nos. | 8 | 12 | 96 |
| Tecomaria capensis | nos. | 10 | 12 | 120 |

TABLE 3-continued

Water consumption for each softscape item:
previous situation for PARKING 4 landscape area.

| Plant List Botanical Names | Unit | Quantity | Daily Water Requirements/Day | Total Requirements/Day |
|---|---|---|---|---|
| *Vitex agnus castus* | nos | 3 | 12 | 36 |
| *Saesalpinia pulcherrima* | nos | 12 | 12 | 144 |
| *Myrtus communis* | nos | 12 | 12 | 144 |
| Succulents | | | | |
| *Agave americana* | nos | 12 | 6 | 72 |
| Groundcover & climber | | | | |
| *Rosmarinus officinalis* | nos | 1951 | 8 | 15,608 |
| *Gazania nivea* | nos | 1944 | 8 | 15,552 |
| *Cortaderia seloania* | nos | 54 | 8 | 432 |
| Grass | | | | |
| *Cynodon dactylon* | m² | 1213 | 12 | 14556 |
| | | | TOTAL/DAY | 48,600 L |

TABLE 4

Water consumption for each softscape item:
Applying xeriscaping for PARKING 4 landscape.

| Plant List Botanical Names | Unit | Quantity | Daily Water Requirements/Day | Total Requirements/Day |
|---|---|---|---|---|
| Palms | | | | |
| Trees | | | | |
| *Callistemon viminalis* | nos. | 4 | 80 | 320 |
| *Cassia indosa* | nos. | 5 | 80 | 400 |
| *Hibiscus tiliaceaus* | nos. | 4 | 80 | 320 |
| *Plumeria obtuse* | nos. | 4 | 80 | 320 |
| *Cassia fistula* | nos. | 6 | 80 | 480 |
| Shrubs | | | | |
| *Hibiscus rosa sinensis* | nos. | 8 | 12 | 96 |
| *Tecomaria capensis* | nos. | 10 | 12 | 120 |
| *Vitex agnus castus* | nos | 3 | 12 | 36 |
| *Caesalpennia pulcherrima* | nos. | 12 | 12 | 144 |
| *Myrtus communis* | nos | 12 | 12 | 144 |
| Succulents | | | | |
| *Agave americana* | nos. | 12 | 6 | 72 |
| Groundcover & climber | | | | |
| *Rosmarinus officinalis* | nos | 1951 | 8 | 15,608 |
| *Cortaderia seloania* | nos | 54 | 8 | 432 |
| Grass | | | | |
| *Cynodon dactylon* | m² | 262 | 12 | 3144 |
| Hard material | | | | |
| mulch | m² | 160 | 0 | 0 |
| Natural gravel | m² | 210 | 0 | 0 |
| Natural stone | m² | 280 | 0 | 0 |
| Interlock | m² | 300 | 0 | 0 |
| | | | TOTAL/DAY | 21,636 L |

Study Field Experiment 3: Gate 11 Landscape

The Previous Situation for Gate 11 Landscape Area

This study field experiment location is beside residential campus gate no. 11, with an area of 3700 m². Before the study, the gate layout finishes contained stamped concrete, interlock as hardscape, and finishes in tender design contained terrazo tiles. The hardscape for pavement and softscape items were:

palms: phoenix dactylifera, and american palm;

trees: pithecellobium dulce, hibiscus tiliaceaus, vitex agnus castus, nerium oleander, and cassia glauca;

groundcover and climber: rosmarinus officinalis, cortaderia seloania; grass: cynodon dactylon.

Figure 5:
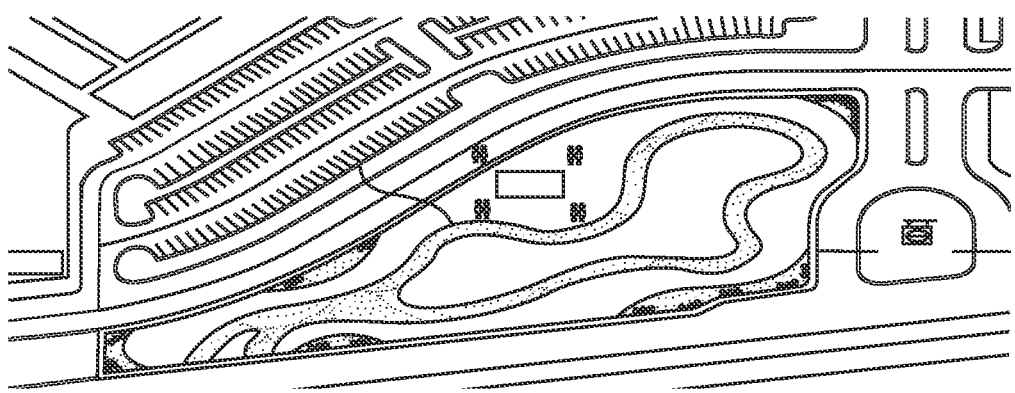
FIG. 5 shows the consumption water quantity for each soft scape item, the tender design for this area, and the photo before applying the present study to GATE 11.

FIG. 5 shows the consumption water quantity for each soft scape item, the tender design for this area, and the photo before applying this study. The total was 72,045 L (72.5m³) of water consumption.

Applying Xeriscaping for Gate 11 Landscape Area

Figure 6:
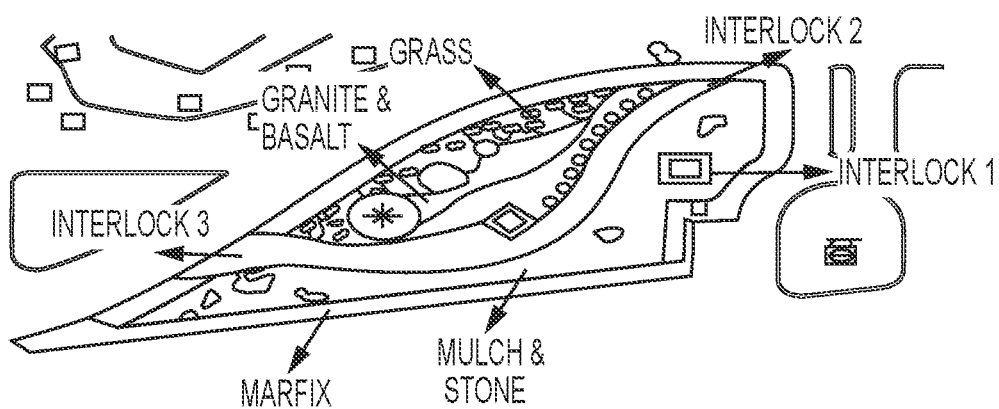
FIG. 6 shows the area after applying xeriscaping to GATE 11.

In this study field experiment, the layout design contained palms: phoenix dactylifera, trees: hibiscus tiliaceaus; succulents: agave americana; groundcover and climber: rosmarinus officinalis; grass: cynodon dactylon; hard material: mulch, natural gravel, and natural stone; with total/day 47,780 L (47.8 m³) of water consumption with around 39% water consumption reduction. FIG. 6 shows the area after applying to xeriscape for the activity walkway landscape.

The Gate 11 landscape with an area of 24,960 m² initially had a design containing two hard landscape items and 14 urban native softscape items with 72,045 L (72.5 m³) of water consumption. Applying the xeriscaping landscape design changed the design to one containing four hard landscape items and 14 urban native softscape items with a total/day of 47,780 L (47.8 m³) of water consumption, i.e., a 39% water consumption reduction.

The Parking 14 landscape with an area of 1371 m² initially had a design containing 2 hard landscape items and 16 urban native softscape items with a total of 45,814 L (45.8 m³) of water consumption. Applying the xeriscaping landscape design changed the design to one having four hardscapes and 16 urban native softscape with a total/day of 33,478 L (33.5 m³) of water consumption, i.e., a 27% water consumption reduction.

The results of this study can be seen in the following Tables 5 and 6, reflecting before and after xeriscaping:

TABLE 5

Water consumption for each softscape item: previous situation for GATE 11 landscape area.

| Plant List/Botanical Names | Unit | Quantity | Daily Water Requirements/Day | Total Requirements/Day |
|---|---|---|---|---|
| PALMS | | | | |
| phoenix dactylifera | nos. | 30 | 100 | 3000 |
| American palm | nos | 10 | 70 | 700 |
| TREES | | | | |
| Pithecellobium dulce | nos. | 15 | 15 | 225 |
| Shrubs | | | | |
| hibiscus tiliaceaus | nos. | 130 | 60 | 7800 |
| Vitex Agnus Castus | nos | 10 | 20 | 200 |
| Nerium oleander | nos | 10 | 20 | 200 |
| cassia glauca | nos | 263 | 40 | 10,520 |
| GROUNDCOVER & CLIMBER | | | | |
| rosmarinus officinalis | m² | 100 | 8 | 800 |
| cortaderia seloania | m² | 100 | 8 | 800 |
| GRASS | | | | |
| cynodon dactylon | m² | 4400 | 12 | 52,800 |

TOTAL/DAY 77,045 L

TABLE 6

Water consumption for each softscape item: Applying xeriscaping for GATE 11 landscape.

| Plant List/Botanical Names | Unit | Quantity | Daily Water Requirements/Day | Total Requirements/Day |
|---|---|---|---|---|
| Palms | | | | |
| phoenix dactylifera | nos. | 42 | 100 | 4200 |
| Trees | | | | |
| hibiscus tiliaceaus | nos. | 200 | 60 | 12,000 |
| cassia glauca | nos | 73 | 40 | 2920 |

TABLE 6-continued

Water consumption for each softscape item:
Applying xeriscaping for GATE 11 landscape.

| Plant List/Botanical Names | Unit | Quantity | Daily Water Requirements/Day | Total Requirements/Day |
|---|---|---|---|---|
| Shrubs | | | | |
| hibiscus rosa-sinensis | nos. | 35 | 12 | 540 |
| Nerium oleander | nos. | 20 | 6 | 120 |
| Groundcover & climber | | | | |
| rosmarinus officinalis | m² | 2000 | 8 | 16,000 |
| Grass | | | | |
| cynodon dactylon | m² | 1000 | 12 | 12,000 |
| Hard material | | | | |
| mulch | m² | 150 | 0 | 0 |
| Natural gravel | m² | 200 | 0 | 0 |
| Natural stone | m² | 250 | 0 | 0 |
| | | | TOTAL/DAY | 47,780 L |

Study Field Experiment 4: Activity Walkway

The Previous Situation for the Activity Walkway Landscape Area

This study field experiment had an area of 24,960 m². The walkway is 520 m in length and 43 m in width. The hardscape for pavement and softscape items were:

Palms: phoenix dactylifera and american palm;

trees: hibiscus tiliaceaus, vitex agnus castus, nerium oleander, and cassia glauca;

Shrubs: hibiscus rosa-sinensis;

Succulents: agave americana;

groundcover and climber: rosmarinus officinalis, cortaderia seloania;

grass: cynodon dactyl with 4 circle fountain.

Figure 7:
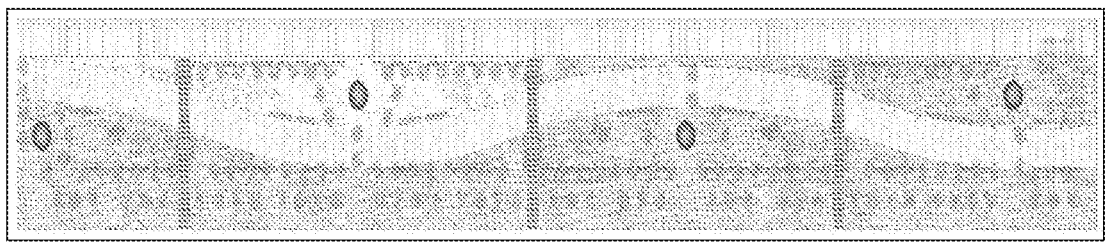
FIG. 7 shows the consumption water quantity for each soft scape item, the tender design for this area, and the photo before applying the present study to the Activity Walkway Landscape.

This configuration had a total 237,330 L (237.3 m³) of water consumption. FIG. 7 shows the consumption water quantity for each soft scape item, the tender design for this area, and the photo before applying this study.

Applying Xeriscaping for Activity Walkway Landscape Area

Figure 8:
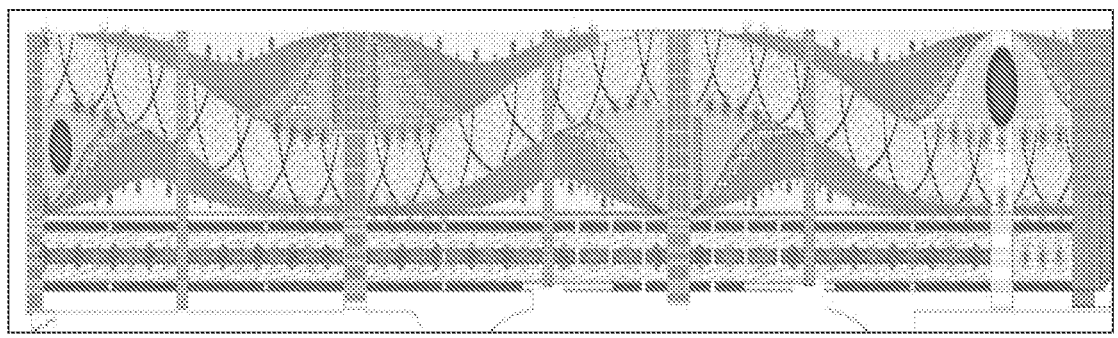
FIG. 8 shows the area after applying the xeriscaping for the Activity Walkway Landscape.

In this study experiment, the layout design contained palms: palm date; trees: ziziphus spina, albizia lebbeck, and tamarindus indica; Shrubs: moring indica, and aloe vera; groundcover and climber: bougain vililea; grass: grass c12000; hard material: mulch, natural gravel, natural stone, and Interlock with 6 circle fountain with total/day 138,450 L (138.5 m³) of water consumption with around 42.1% water consumption reduction. FIG. 8 shows the area after applying the xeriscaping for the activity walkway landscape.

The Activity walkway with an area of 15,766 m² initially had a design containing 2 hardscape items and 14 urban native softscape items with a total of 237,330 L (237.3 m³) of water consumption. Applying the xeriscaping landscape design changed the design to one containing four hard landscape items and 14 urban native softscape items with a total/day of 138,450 L (138.5 m³) of water consumption, i.e., a 42.1% water consumption reduction.

The results of this study can be seen in the following Tables 7 and 8, reflecting before and after xeriscaping:

TABLE 7

Water consumption for each softscape item:
previous situation for WALKWAY landscape area.

| Plant list/Botanical Names | Unit | Quantity | Daily Water Requirements/Day | Total Requirements/Day |
|---|---|---|---|---|
| Palms | | | | |
| phoenix dactylifera | nos. | 80 | 150 | 12,000 |
| American palm | nos | 15 | 70 | 1050 |
| Trees | | | | |
| Shrubs | | | | |
| hibiscus rosa-sinensis | nos. | 45 | 12 | 480 |
| Vitex Agnus Castus | nos | 50 | 20 | 1000 |
| Nerium oleander | nos | 15 | 20 | 300 |
| cassia glauca | nos | 100 | 40 | 4000 |

TABLE 7-continued

Water consumption for each softscape item:
previous situation for WALKWAY landscape area.

| Plant list/Botanical Names | Unit | Quantity | Daily Water Requirements/Day | Total Requirements/Day |
|---|---|---|---|---|
| Succulents | | | | |
| agave americana | nos. | 150 | 6 | 900 |
| Groundcover & climber | | | | |
| rosmarinus officinalis | m² | 2000 | 8 | 1600 |
| Grass | | | | |
| cynodon dactylon | m² | 14,000 | 15 | 210,000 |
| | | | TOTAL/DAY | 237,330 L |

TABLE 8

Water consumption for each softscape item:
Applying xeriscaping for WALKWAY landscape.

| Plant List/Botanical Names | Unit | Quantity | Daily Water Requirements/Day | Total Requirements/Day |
|---|---|---|---|---|
| Palms | | | | |
| Palm date | nos. | 123 | 100 | 12300 |
| Trees | | | | |
| ziziphus spina | nos. | 20 | 60 | 1200 |
| albizia lebbeck | nos | 30 | 60 | 1800 |
| tamarindus indica | nos | 25 | 60 | 1500 |
| moring indica | nos. | 15 | 60 | 900 |
| Shrubs | | | | |
| bougain vililea | nos | 3540 | 15 | 53,100 |
| Groundcover & climber | | | | |
| aloe vera | nos. | 40 | 6 | 2400 |
| Grass | | | | |
| grass CL-2000 | m² | 3190 | 12 | 38,280 |
| Hard material | | | | |
| mulch | m² | 120 | 0 | 0 |
| Natural gravel | m² | 65 | 0 | 0 |
| Natural stone | m² | 45 | 0 | 0 |
| Interlock | | | | |
| | | | TOTAL/DAY | 138,450 L |

Study for Remaining KFU Landscape Area

The total green area within the KFU university landscape layout campus is 118.640 m² (university campus 73,110 m² and residential area is 45,530 m²) with water consumption of 3911 m³/day. The water consumption of KFU's landscape layout is 3.910.530 L (3911 m³) from non-renewable 15 artesian wells' water sources. The four study experiments, with a total area of 31,750 m² representing 22% of the total KFU landscape layout, were selected to apply the xeriscaping landscape concept instead of the existing conventional landscape throughout the campus. The landscape items employed were 10 shrubs, 11 trees, 2 palms, 6 groundcover and climber plant, 2 succulents, grass, and 4 hard materials. There was clear water saving in the four experiments of the study.

The water consumption before applying the xeriscaping landscape (L) was: Parking 14 L, Parking 4 48,600 L, Gate 11 72,045 L, Walkway 237,330 L. The water consumption per liter (L) after applying xeriscaping landscape was: Parking 14 33,478 L, Parking 21,636 L, Gate 11 47,780 L, Walkway 138,450 L. The total water consumption for the four experiment areas before the study was 408,789 (408.8 m³)/day and an average of 100,219 L (100.2 m³)/day.

The water consumption for the four experiment areas after applying the study approach became 241,344 (241.4 m³)/day with an average of 60,336 L (60.3 m³)/day. This means that the total water consumption reduction was 167,445 L (167.5 m³), representing 41% of the total selected area.

The study showed that the experiment 4 walkway landscape had the lowest water consumption of 8.8 L/m², as monitored for 1 year using experts physical monitoring and the main SCADA system for the demand water for irrigation quantity. Hence, significant landscape design quantities for each xeriscaping landscape item according to the lowest water consumption landscape in the walkway project can be applied to the remaining landscape layout area of 86,890 m², with the following percentage for each item. The first is softscape, which includes palms 1%, trees 5%, shrubs and succulents 5%, groundcover and climber 40%, and grass 20%. The second is hardscape, which includes mulch and natural gravel 10%, natural stone and interlock 19%, which can consume 20,300 L (20.3 m³)/day, compared with the previous four case studies, which consume an average of 60336 L (60.4 m³)/day, as well as less than the lowest water. These initial results are seen in Table 9 below:

TABLE 9

| First study for applying Xeriscaping concept in area 30 m × 30 m. | | | | |
|---|---|---|---|---|
| Plant List Botanical Names | Unit | Quantity | Daily Water Requirements/Day | Total Requirements/Day |
| Palms | | | | |
| *Phoenix dactylifera* | No. | 5 | 100 | 500 |
| Trees | | | | |
| *Albizia lebbeck* | No. | 10 | 60 | 600 |
| *Azadirachta indica* | No. | 10 | 60 | 600 |
| *Ziziphus spina* | No. | 10 | 60 | 600 |
| *Hibiscus tiliaceus* | No. | 10 | 60 | 600 |
| *Pithecellobium dulce* | No. | 10 | 60 | 600 |
| Shrubs | | | | |
| *Cassia Glauca* | No. | 100 | 15 | 1500 |
| *Bougainvillea* | No. | 100 | 15 | 1500 |
| *Vitex agnus* | No. | 100 | 15 | 1500 |
| *Plumeria obtusa* | No. | 100 | 15 | 1500 |
| Succulents | | | | |
| *Aloe perfoliata* var. *vera* | No. | 75 | 6 | 450 |
| *Agava-Americana* | No. | 75 | 6 | 450 |
| *yucca* | No. | 50 | 6 | 300 |
| Groundcover & climber | | | | |
| *Alternanthera.* | m² | 2000 | 8 | 2400 |
| *Gazania Grandifloura* | m² | 2000 | 8 | 2400 |
| *Wedelia florida* | m² | 2000 | 8 | 2400 |
| Grass | | | | |
| Grass-C2000 | m² | 200 | 12 | 2400 |
| Hard material | | | | |
| mulch | m² | 50 | | 0 |
| Natural gravel | m² | 75 | | 0 |
| Natural stone | m² | 75 | | 0 |
| Interlock | m² | 190 | | 0 |
| | | | | TOTAL/DAY 20,300 L |

The study showed significant results in the landscape layout field supporting natural resources conservation such as water consumption in the coordination of urban landscape design of universities in desert areas. The KFU campus achieved pioneer projects in Saudi Arabia and the Gulf area region in life quality and natural resources conservation.

A second, similar study was conducted to determine whether better results could be achieved, labeled as "KFUscaping", meaning xeriscaping optimized as applied to the KFU campus. The experiments aimed to achieve best practices for arid and/or semi-arid regions landscape layout. The area of 30 m×30 m as prototype matrix to measure water consumption was selected for the study. The results of the experiments showed the following percentage for achieving KFUscaping and reducing water up to 82% (according to the average for the consumption quantity 20300 L and lowest consumption per meter ratio 7.8 L/m² (as seen in Table 9 above for the initial full campus study), while ensuring best design of landscape. First: Soft material: Palms 2%, Trees 5%, Shrubs & Succulent 5%, Groundcover & climber 32%, Grass 3%; Second: Solid material: mulch &Natural gravel 16%, natural stone 16% & interlock 21%. KFUscaping achieved 2030 liter (20.3 m³)/day and 2.26 L/m² in water consumption compared with the existing campus consumption average 15.1 L/m².

resources, i.e., water. These results can support decision-makers, landscape engineers, agriculture engineers, architects' engineers, and any interested person or specialist organization to design their own ideas following the KFUscaping soft and solid materials quantities and ratios with approximately 2.26 L/m² water consumption rate.

These studies confirm that using native plants is crucial due to their potential to develop landscapes in saline and water shortage conditions, leading to a reduction in water consumption for landscaping. These studies also confirmed that landscape design and the xeriscape principles have significant benefits in terms of economic and environmental contributions.

These results demonstrate the validity of applying urban xeriscaping landscape as a practical potential approach to conserve water resources content inside the KFU campus. The study field experiment used 24 urban native softscape types and four hardscape items available in Saudi Arabia in four areas. The total four experiment areas, covering 31,750 m², represent 22% of the total KFU campus green landscape layout. Using numerical assessment through experts' physical monitoring supported by maintenance discipline SCADA system, each of the selected four areas achieved a significant rate in water consumption reduction after converting the conventional landscape to a xeriscaped landscape.

TABLE 10

Implementation of KFUscaping in area 30 m × 30 m

| Plant list botanical names, | Unit | Quantity | Daily water requirements/day | Total requirements/day |
|---|---|---|---|---|
| *Phoenix dactylifera* | Number | 2 | 100 | 200 |
| Trees | | | | |
| *Albizia lebbeck* | Number | 3 | 50 | 150 |
| *Azadirachta indica* | Number | 3 | 50 | 150 |
| *Ziziphus spina* | Number | 3 | 50 | 150 |
| *Hibiscus tiliaceus* | Number | 3 | 50 | 150 |
| *Pithecellobium dulce* | Number | 3 | 50 | 150 |
| Shrubs | | | | |
| *Cassia Glauca* | Number | 5 | 9 | 45 |
| *Bougainvillea* | Number | 6 | 9 | 54 |
| *Vitex agnus* | Number | 5 | 9 | 45 |
| *Plumeria obtusa* | Number | 6 | 9 | 54 |
| Succulents | | | | |
| *Aloe perfoliata* var. *vera* | Number | 15 | 6 | 90 |
| *Agava - Americana* | Number | 15 | 6 | 90 |
| *yucca* | Number | 15 | 6 | 90 |
| Groundcover & climber | | | | |
| *Alternanthera.* | m² | 22 | 6 | 132 |
| *Gazania Grandifloura* | m² | 20 | 6 | 120 |
| *Wedelia florida* | m² | 20 | 6 | 120 |
| Grass | | | | |
| Grass - C2000 | m² | 20 | 12 | 240 |
| Solid material | | | 0 | |
| mulch | m² | 150 | 0 | 0 |
| Natural gravel | m² | 150 | 0 | 0 |
| Natural stone | m² | 75 | 0 | 0 |
| Interlock | m² | 190 | 0 | 0 |
| Total Liter consumption/day | | | | 2030 |
| Total daily Liter consumption/m2 | | | | 2.26 |

This "KFUscaping", then, is of great value for usage in public and private space in arid and semi-arid regions. It supports the national and international direction towards transforming into green societies while saving natural It is to be understood that the approach for landscaping in arid or semi-arid regions that maximizes water conservation is not limited to the specific embodiments described above but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method for promoting water conservation using a sustainable landscape, comprising:
   retrofitting a 30 m²×30 m² surface area of desert retrofitted with amounts of soft and solid materials sufficient to reduce water consumption of plants in the area by up to 82% per day; and
   maintaining the appearance of a landscaped area,
   the soft materials in the area of desert comprising native plants comprising, in percentage of area covered:
   2% palm,
   5% trees,
   5% shrubs and succulents,
   32% groundcover and climbers, and
   3% grass; and
   the solid materials in the area of desert comprising, in percentage of area covered:
   16% mulch and natural gravel;
   16% natural stone; and
   21% interlock.

2. The method for promoting water conservation as recited in claim 1, wherein the palm is Phoenix dactylifera.

3. The method for promoting water conservation as recited in claim 1, wherein the trees comprise Albizia lebbeck, Azadirachta indica, Ziziphus spina, Hibiscus tiliaceus, and Pithecellobium dulce.

4. The method for promoting water conservation as recited in claim 1, wherein the shrubs and succulents comprise Cassia Glauca, Bougainvillea, V itex agnus, Plumeria obtusa, Aloe perfoliate var. vera, Agava—Americana, and yucca.

5. The method for promoting water conservation as recited in claim 1, wherein the groundcover and climbers comprise Alternanthera, Gazania Grandifloura, and Wedelia florida.

6. The method for promoting water conservation as recited in claim 1, wherein the grass is grass CL-2000.

7. The method for promoting water conservation as recited in claim 1, consisting of 2 Phoenix dactylifera, 3 Albizia lebbeck, 3 Azadirachta indica, 3 Ziziphus spina, 3 Hibiscus tiliaceus, 3 Pithecellobium dulce, 5 Cassia Glauca, 6 Bougainvillea, 5 V itex agnus, 6 Plumeria obtusa, 15 Aloe perfoliate var. vera, 15 Agava—Americana, 15 yucca, 22 m² of 20 m² of Alternanthera, 20 m² of Gazania Grandifloura, 20 m² of Wedelia florida, 20 m² of grass CL-2000, 150 m² of mulch, 150 m² of natural gravel, 20 m² of natural stone, and 190 m² of interlock.

8. The method for promoting water conservation as recited in claim 1, wherein the sustainable landscape consumes 2030 liters of water per day.

9. The method for promoting water conservation as recited in claim 1, wherein the sustainable landscape consumes 2.26 liters of water per m².

10. A method for reducing water consumption of plants in a 30×30 m² area of a sustaintable landscape by up to 82% per day while maintaining the appearance of a landscaped area and promoting water conservation, comprising:
    selecting a 30²×30 m² surface area of desert;
    retrofitting the selected surface area of desert with amounts of soft and solid materials sufficient to reduce water consumption of plants in the surface area of desert by up to 82% per day; and
    maintaining the appearance of a landscaped area promoting water conservation,
    wherein the soft materials in the surface area of desert comprise plants comprising, in percentage of area covered:
    2% palm,
    5% trees,
    5% shrubs and succulents,
    32% groundcover and climbers, and
    3% grass; and
    wherein the solid materials in the surface area of desert comprise, in percentage of area covered:
    16% mulch and natural gravel,
    16% natural stone, and
    21% interlock.

11. The method for reducing water consumption as recited in claim 10, wherein the palm is Phoenix dactylifera.

12. The method for reducing water consumption as recited in claim 10, wherein the trees comprise Albizia lebbeck, Azadirachta indica, Ziziphus spina, Hibiscus tiliaceus, and Pithecellobium dulce.

13. The method for reducing water consumption as recited in claim 10, wherein the shrubs and succulents comprise Cassia Glauca, Bougainvillea, V itex agnus, Plumeria obtusa, Aloe perfoliate var. vera, Agava—Americana, and yucca.

14. The method for reducing water consumption as recited in claim 10, wherein the groundcover and climbers comprise Alternanthera, Gazania Grandifloura, and Wedelia florida.

15. The method for reducing water consumption as recited in claim 10, wherein the grass is grass CL-2000.

16. The method for reducing water consumption as recited in claim 10, wherein the amounts of soft and solid materials sufficient to reduce water consumption of plants in the surface area of desert consist of 2 Phoenix dactylifera, 3 Albizia lebbeck, 3 Azadirachta indica, 3 Ziziphus spina, 3 Hibiscus tiliaceus, 3 Pithecellobium dulce, 5 Cassia Glauca, 6 Bougainvillea, 5 V itex agnus, 6 Plumeria obtusa, 15 Aloe perfoliate var. vera, 15 Agava—Americana, 15 yucca, 22 m² of 20 m² of Alternanthera, 20 m² of Gazania Grandifloura, 20 m² of Wedelia florida, 20 m² of grass CL-2000, 150 m² of mulch, 150 m² of natural gravel, 75 m² of natural stone, and 190 m² of interlock.

17. The method for reducing water consumption as recited in claim 10, wherein the sustainable landscape consumes 2030 liters of water per day.

18. The method for reducing water consumption as recited in claim 10, wherein the sustainable landscape consumes 2.26 liters of water per m².

19. A system for sustainable landscape promoting water conservation using a sustainable landscape, comprising:
    a 30 m²×30 m² surface area of desert retrofitted with amounts of soft and solid materials sufficient to reduce water consumption of plants in the area by up to 82% per day while maintaining the appearance of a landscaped area,
    the soft materials in the area of desert comprising plants consisting of, in percentage of area covered:
    2% palm made up of 2 Phoenix dactylifera,
    5% trees made up of 3 Albizia lebbeck, 3 Azadirachta indica, 3 Ziziphus spina, 3 Hibiscus tiliaceus, and 3 Pithecellobium dulce,
    5% shrubs and succulents made up of 5 Cassia Glauca, 6 Bougainvillea, 5 V itex agnus, 6 Plumeria obtusa, 15 Aloe perfoliate var. vera, 15 Agava—Americana, and 15 yucca, 32% groundcover and climbers made up of 22 m² of 20 m² of Alternanthera, 20 m² of Gazania Grandifloura, and 20 m² of Wedelia florida, and 3% grass made up of 20 m² of grass CL-2000; and the solid materials in the area of desert comprising, in percentage of area covered:

16% mulch and natural gravel made up of 150 m² of mulch and 150 m² of natural gravel, 16% natural stone made up of 75 m² of natural stone, and 21% interlock made up of 190 m² of interlock.

20. The system for promoting water conservation as recited in claim 19, wherein the sustainable landscape consumes 2030 liters of water per day.

\* \* \* \* \*